(12) United States Patent
Watanabe et al.

(10) Patent No.: US 10,953,580 B2
(45) Date of Patent: Mar. 23, 2021

(54) SPRUE-BUSH

(71) Applicant: PANASONIC INTELLECTUAL PROPERTY MANAGEMENT CO., LTD., Osaka (JP)

(72) Inventors: Shinya Watanabe, Hyogo (JP); Satoshi Abe, Osaka (JP); Kenichi Tanaka, Osaka (JP); Mikio Mori, Osaka (JP); Yoshiyuki Uchinono, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/313,435

(22) PCT Filed: Jun. 28, 2017

(86) PCT No.: PCT/JP2017/023813
§ 371 (c)(1),
(2) Date: Dec. 26, 2018

(87) PCT Pub. No.: WO2018/003882
PCT Pub. Date: Jan. 4, 2018

(65) Prior Publication Data
US 2019/0224897 A1    Jul. 25, 2019

(30) Foreign Application Priority Data
Jun. 29, 2016  (JP) .............................. JP2016-129261

(51) Int. Cl.
*B29C 45/27*  (2006.01)
*B29C 45/73*  (2006.01)

(52) U.S. Cl.
CPC .......... *B29C 45/2725* (2013.01); *B29C 45/27* (2013.01); *B29C 45/73* (2013.01); *B29C 2045/2733* (2013.01)

(58) Field of Classification Search
None
See application file for complete search history.

(56) References Cited

U.S. PATENT DOCUMENTS

| 4,238,106 A | * | 12/1980 | Willingham | .......... B29C 45/401 249/59 |
| 4,260,348 A | * | 4/1981 | Graham | .............. B29C 45/2756 425/144 |

(Continued)

FOREIGN PATENT DOCUMENTS

| JP | 07-276457 | 10/1995 |
| JP | 2003-220634 | 5/2003 |

(Continued)

OTHER PUBLICATIONS

European Extended Search Report in corresponding European Application No. 17820236.2, dated May 13, 2019.

(Continued)

*Primary Examiner* — Jacob T Minskey
*Assistant Examiner* — Baileigh Kate Darnell
(74) *Attorney, Agent, or Firm* — Greenblum & Bernstein, P.L.C.

(57) ABSTRACT

In order to provide a sprue-bush which is capable of suitably cooling a melt raw resin in a raw resin-flow path as a whole, there is provided a sprue-bush, comprising a raw resin-flow path and a cooling medium-flow path located around the raw resin-flow path, wherein a width dimension of the raw-resin flow path gradually becomes larger toward a downstream side-end surface of the sprue-bush, and wherein the downstream side-end surface of the sprue-bush is a heat transfer surface.

11 Claims, 7 Drawing Sheets

(56) References Cited

U.S. PATENT DOCUMENTS 5,096,410 A     3/1992   Loulourgas
8,202,081 B2 *   6/2012   Neter ................. B29C 45/7312
                                                                        425/547

FOREIGN PATENT DOCUMENTS

| JP | 2003-220634 | 8/2003 |
| KR | 2011-0133181 | 12/2011 |
| WO | 2008/038694 | 4/2008 |

OTHER PUBLICATIONS

Official Communication issued in WIPO Patent Application No. PCT/JP2017/023813, dated Aug. 15, 2017, along with English-translaion.
English translation of Official Communication issued in WIPO Patent Application No. PCT/JP2017/023813, dated Jan. 1, 2019.

* cited by examiner

SPRUE-BUSH

TECHNICAL FIELD

The disclosure relates to a sprue-bush. More particularly, the disclosure relates to a sprue-bush which is used in a mold.

BACKGROUND OF THE INVENTION

Technologies supporting "manufacturing" industry in Japan includes a molding technology using molds. The molding technology includes a pressure molding method, an injection molding method, and an extrusion molding method. In these molding methods, the injection molding method is a method for obtaining a molded article from a melt raw resin using a mold for an injection mold.

In the injection molding method, a melt raw resin is injected into a mold cavity 203' composed of the one of molds (i.e., core side mold) 201' of an injection mold 200' and the other of molds (i.e., cavity mold) 202' thereof (see FIG. 8). The injected melt raw resin is subjected to a cooling followed by a solidification in a mold cavity 203' to form a molded article. An injection of the melt raw resin into the mold cavity 203' is generally performed via a sprue-bush 100'.

As shown in FIG. 8, the sprue bush 100' used for the injection mold 200' has a raw resin-flow path 10' therein. The raw resin-flow path 10' extends from an upstream side-beginning portion 10a' into which the melt raw resin is supplied to a downstream side-end portion 10b' leading Into the mold cavity 203'.

The raw resin-flow path 10' is in a form of a taper to make an ejection of the molded article easier. Specifically, a width dimension W' of the raw resin-flow path 10' gradually increases as it extends from the upstream side-beginning portion 10a' to the downstream side-end portion 10b'. As shown in FIG. 8, a width dimension $W_1'$ of an upstream side 10α' of the raw resin-flow path 10' is relatively small, whereas a width dimension $W_2'$ of a downstream side 10β' of the raw resin-flow path 10' is relatively large.

The raw resin-flow path 10' in the form of the taper is preferable in view of the ejection of the molded article, however it may not be necessarily preferable in view of the cooling followed by the solidification of the melt raw resin. For example, in a case where the raw resin-flow path 10' in the form of the taper has a longer length, it may largely affect the downstream side having a relatively large width dimension W'. Namely, it may make the cooling and subsequent solidification of the melt raw resin difficult. In a case that the cooling and subsequent solidification of the melt raw resin is difficult, it may cause an increase of a necessary time from the injection of the melt raw resin to the ejection of the molded article, which may make a molding cycle longer. Accordingly, as shown in FIG. 8, a cooling medium-flow path flow path 20' having a configuration of a straight pipe may be located around the raw resin-flow path 10'.

Patent Documents (Related Art Patent Documents)

Patent Documents 1: WO 2008-038694

DISCLOSURE OF THE INVENTION

Problems to be Solved by the Invention

However, the sprue bush 100' having the cooling medium-flow path 20' with its configuration of the straight pipe therein may cause the following problems.

Specifically, the width dimension W' of the raw resin-flow path 10' in the form of the taper gradually becomes larger toward its downstream side as shown in FIG. 8. Thus, a surface area of a portion having a relatively larger width dimension becomes larger than that of a portion having a relatively smaller width dimension. The larger surface area makes a region for transferring a cooling heat larger, the cooling heat being necessary to cool and subsequently solidify the melt raw resin in the portion having the relatively larger width dimension. Thus, a use of the cooling medium-flow path 20' having the configuration of the straight pipe causes the cooling heat not to sufficiently transfer to the melt raw resin in the portion having the relatively larger width dimension, the cooling heat being due to the cooling medium passing through the cooling medium-flow path 20'.

In particular, the downstream side-end portion 10b' of the raw resin-flow path 10' has the largest width dimension W'. Thus, the downstream side-end portion 10b' of the raw resin flow path 10' nay have the largest surface area compared with that of another portion of the raw resin-flow path 10'. The larger surface area makes the region for transferring the cooling heat larger, the cooling heat being necessary to cool and subsequently solidify the melt raw resin. However, the cooling medium-flow path 20' having the configuration of the straight pipe may obtained by subjecting the sprue-bush 100' to a machine process in a condition of a use of a machine tool or the like, the cooling medium-flow path 20' having the configuration of the straight pipe being used to cool and subsequently solidify the melt raw resin in the raw resin-flow path 10'. Thus, there may be a limitation as to a provision of the cooling medium-flow path 20' having the configuration of the straight pipe to a vicinity of the downstream side-end portion 10b' of the raw resin-flow path 10' in terms of a machining accuracy. Thus, a use of the cooling medium-flow path 20' having the configuration of the straight pipe causes the cooling heat not to sufficiently transfer to the melt raw resin in the downstream side-end portion 10b' of the raw resin-flow path 10', the cooling heat being due to the cooling medium passing through the cooling medium-flow path 20'. As a result, there is a possibility that the melt raw rosin in the raw resin-flow path 10' cannot suitably be cooled and subsequently solidified as a whole.

Under these circumstances, the present invention has been created. That is, an object of the present invention is to provide a sprue-bush which is capable of suitably cooling a melt raw resin in a raw resin-flow path as a whole.

Means for Solving the Problems

In order to achieve the above object, an embodiment of the present invention provides a sprue-bush, comprising a raw resin-flow path and a cooling medium-flow path located around the raw resin-flow path, wherein a width dimension of the raw resin-flow path gradually becomes larger toward a downstream side-end surface of the sprue-bush, and wherein the downstream side-end surface of the sprue-bush is a heat transfer surface.

Effect of the Invention

In the sprue-bush according to an embodiment of the present invention, it is possible to suitably cool the melt raw resin in the raw resin-flow path.

BRIEF DESCRIPTION OF THE DRAWINGS

FIG. 6 is a flowchart schematically showing a method for manufacturing a sprue-bush according to the present invention.

MODES FOR CARRYING OUT THE INVENTION

Figure 1:
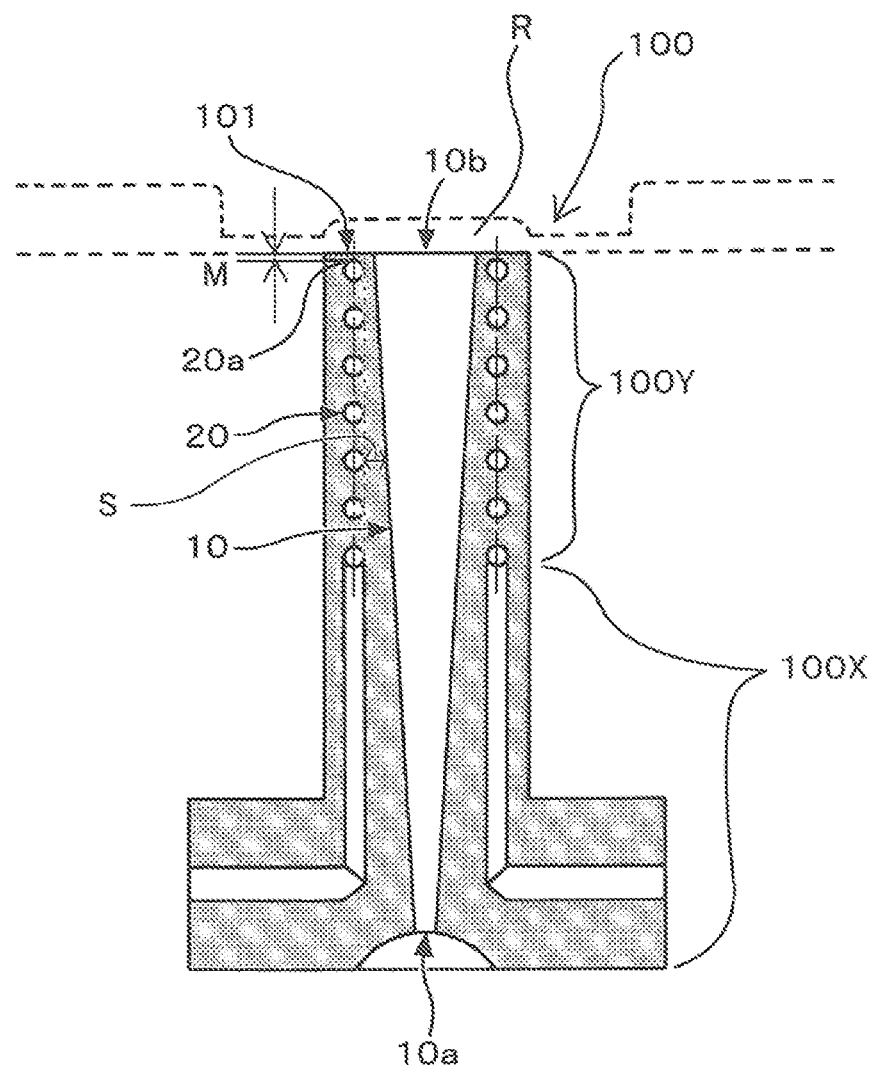
FIG. 1 is a cross-sectional view schematically showing a sprue-bush according to an embodiment of the present invention.

A sprue-bush according to an embodiment of the present invention will be described in more detail with reference to accompanying drawings. It should be noted that s configuration and a dimensional proportion of each of elements in the drawings are merely shown for illustrative purposes, and thus they are not the sane as those of each of actual elements.

As shown in FIG. 1, a sprue-bush 100 according to an embodiment of the present invention includes a raw resin-flow path 10 and a cooling medium-flow path 20 located around the raw resin-flow path 10 in the sprue-bush 100. The raw resin-flow path 10 is configured such that its width-dimension gradually increases toward a downstream side-end surface 101 of the sprue-bush 100 in terms of an easy ejection of a molded article to be finally obtained. As shown in FIG. 1, an upstream side region 100X of the sprue-bush 100 tray be configured such that an upstream side of the cooling medium-flow path 20 having a configuration of a straight pipe is located around an upstream side of the raw resin-flow path 10. A downstream side region 100Y of the sprue-bush 100 may be configured such that a downstream side of the cooling medium-flow path 20 is located around a downstream side of the raw resin-flow path 10.

The "cooling medium-flow path 20 of the sprue-bush 100" is a flow path for flowing the cooling medium and is a flow path which contributes to a cooling of a melt raw resin in the raw resin-flow path 10. That is, at the time of molding, a temperature of the melt raw resin in raw resin-flow path 10 is decreased due to the cooling medium flowing through the cooling medium-flow path 20. The "cooling medium" as used herein means a fluid capable of giving a cooling effect to the melt raw resin in the raw resin-flow path 10, the fluid corresponding to cooling water or cooling gas for example. The "upstream side of the raw resin-flow path 10" as used herein means a portion located on a proximal side with respect to the upstream side-beginning portion 10a into which the melt raw resin is supplied. On the other hand, the "downstream side of the raw resin-flow path 10" as used herein means a portion located on a distal side with respect to the upstream side-beginning portion 10a into which the melt raw resin is supplied. Although a boundary between the upstream side and the downstream side of the raw resin-flow path is net particularly limited, the boundary is a half division portion of a height of the sprue-bush of the present invention. More specifically, "the upstream side of the raw resin-flow path 10" corresponds to a region ex-ending from the upstream side-beginning portion 10a of the raw resin-flow path 10 to the "half division portion of a height of the sprue-bush of the present invention", for example. On the other hand, "the downstream side of the raw resin-flow path 10" corresponds to a region extending from the "half division portion of a height of the sprue-bush of the present invention" to the downstream side-end portion 10b of the raw resin-flow path 10, for example. The "upstream side of the cooling medium-flow path 20" as used herein means a predetermined portion of the cooling medium-flow path 20 located around the upstream side of the raw resin-flow path 10. On the other hand, the "downstream side of the cooling medium-flow path 20" as used herein means a predetermined portion of the cooling medium-flow path 20 located around the downstream side of the raw resin-flow path 10.

The "downstream side-end surface 101 of the sprue-bush 100" as used herein means a substantially entire end surface of the sprue-bush 100, the end surface directly contacting a mold, more specifically, a runner portion R in the mold, and also a surface including the "downstream end portion 10b of the raw resin-flow path 10". The phrase "downstream side end surface 101 of the sprue bush 100 is a heat transfer surface" as used herein means that the downstream end surface 101 of the sprue bush 100 may suitably function as a surface for transferring a heat energy to a material where a heat transfer is performed. The phrase downstream side end surface 101 of the sprue bush 100 is a heat transfer surface" as used herein means that the downstream end surface 101 of the sprue bush 100 may function as a surface having a heat transfer efficiency (i.e., a heat transmission coefficient) relatively higher than that of a surface other than the downstream end surface 101 such as a side surface of the sprue-bush 100 along an extension direction of the raw resin-flow path), or may function as a surface having the same heat transfer efficiency as that of the surface other than the downstream end surface 101. The "heat energy" as used herein substantially means a cooling heat energy due to the cooling medium flowing through the cooling medium-flow path 20. The "material where the heat transfer is performed" as used herein a melt raw resin in the raw resin-flow path 10 and a melt raw resin in the runner portion in an injection meld contacting the sprue-bush 100 for example. In the present invention, it is described that the downstream side end surface 101 of the sprue-bush 100 can suitably function as a heat transfer surface. In this regard, it may be not excluded that a surface other than the downstream side end surface 101 of the sprue-bush 100 may function as a heat transfer surface.

In particular, the present invention is characterized in that a downstream side-end surface 101 of the sprue-bush 100 can suitably function as a heat transfer surface. Normally, in a case that a cooling medium-flow path is formed in a sprue-bush, the cooling medium-flow path may obtained by subjecting the sprue-bush to a machine process in a condition of a use of a machine tool or the like. Thus, there is a limitation as to a provision of the cooling medium-flow path having a configuration of a straight pipe to a vicinity of a downstream side-end portion of the raw resin-flow path in terms of a machining accuracy. The raw resin-flow path is configured such that its width dimension gradually increases toward the downstream side-end portion of the sprue bush, and thus a width dimension of the downstream side-end portion of the raw resin-flow path may be the largest. Due to the largest, width dimension, the cooling heat due to the cooling medium flowing through the cooling medium-flow path may not be suitably transmitted to the melt raw resin in the downstream side-end portion of the raw resin-flow path. This means that a downstream side-end portion 10b of the raw resin-flow path 10 may be a place where a cooling of the melt raw resin is most difficult due to the largest width dimension (i.e., an opening diameter) of the downstream side-end portion 10b of the raw resin-flow path 1C. In this regard, in an embodiment of the present invention, "the downstream side-end surface 101 of the sprue-bush 100 including the downstream side-end portion 10b of the raw resin-flow path 10" can suitably function as the heat transfer surface. Thus, in a case that the heat transfer surface functions as a surface for transferring the cooling heat, it is possible to suitably transfer the cooling heat due to the cooling medium to the melt raw resin in the downstream side-end portion 10b of the raw resin-flow path 10 where the cooling of the melt raw resin is most difficult. Thus, it is possible to suitably cool and subsequently solidify the melt raw resin in the downstream side-end portion 10b of the raw resin-flow path 10 where the cooling of the melt raw resin is most difficult, which allows the melt raw resin in the raw resin-flow path 10 to be suitably cooled as a whole according to an embodiment of the present invention. Therefore, it is possible to reduce a necessary time from a start of an injection of the melt raw resin to an ejection of a molded article, and thus a molding cycle can be shortened.

An embodiment of the present invention allows the downstream side-end surface 101 of the sprue-bush 100 to serve as a heat transfer surface, and thus an embodiment of the present invention may adopt the following aspects.

In an aspect, it is preferable that a spaced distance M between a downstream side-end surface 101 of the sprue-bush 100 and a most downstream portion 20a of the cooling medium-flow path 20 is smaller than a spaced distance S between the raw resin-flow path 10 and the cooling medium-flow path 20 (see FIG. 1).

The "most downstream portion 20a of the coding medium-flow path 20" as used herein means a portion of the cooling medium-flow path 20 which is faced to the downstream end surface 101 of the sprue-bush 100 at a closest position (see FIG. 1). The "spaced distance S" as used herein means a distance between a portion of the cooling medium-flow path 20 which is closest to the raw resin-flow path 10 and the raw resin-flow path 10 facing the closest portion of the cooling medium-flow path 20. Namely, the "spaced distance S" substantially means a shortest width dimension between the raw resin-flow path 10 and the cooling medium-flow path 20.

This aspect is characterized in that the spaced distance M between the downstream side-end surface 101 of the sprue-bush 100 and the most downstream portion 20a of the cooling medium-flow path 20 is smaller than the spaced distance S between the raw resin-flow path 10 and the cooling medium-flow path 20. The spaced distance S between the raw resin-flow path 10 and the cooling medium-flow path 20 is generally controlled to be relatively small in terms of an easier transfer of the cooling heat to the melt raw resin in the raw resin-flow path 10, the cooling heat being due to the cooling medium flowing through the cooling medium-flow path 20. This means that the coding medium-flow path 20 is positioned to be close to the raw resin-flow path 10. Furthermore, the spaced distance M is configured to be further smaller than the spaced distance S in this aspect (see FIG. 1). This means that the most downstream portion 20a of the cooling medium-flow path 20 is positioned to be "closer" to the downstream side-end surface 101 of the sprue-bush 100.

Due to a closer position of the most downstream portion 20a of the ceding medium-flow path 20 to the downstream side-end surface 101, the cooling heat can be effectively transferred from the most downstream portion 20a to the downstream side-end surface 101 of the sprue-bush 100. Due to the effective transfer of the cooling heat to the downstream side-end surface 101, it is possible to effectively transfer the cooling heat due to the cooling medium to the melt raw resin in the downstream side-end portion 10b of the raw resin-flow path 10 where the cooling is most difficult, the downstream side-end portion 10b of the raw resin-flow path 10 being located in a region of the downstream side-end surface. Therefore, the melt raw resin in the downstream side-end portion 10b of the raw resin-flow path 10 can be effectively cooled and subsequently solidified.

Furthermore, the sprue-bush 100 may be arranged to contact the injection mold. Thus, the cooling heat can be transferred to the injection mold in a contact with the sprue-bush 100, the cooling heat being a heat to be effectively transferred from 5 position of the most downstream portion 20a to the downstream side-end surface 101 of the sprue-bush 100. More specifically, the cooling heat can be transferred to the runner portion R of the injection mold in a contact with the sprue-bush 100. As a result, the melt raw resin in the injection mold located in a vicinity of a contact region with the sprue-bush 100 can be also effectively cooled and subsequently solidified. The effective cooling and subsequent solidification of the melt raw resin in the injection mold may contribute to a reduction of a necessary time from a start of an injection of the melt raw resin to an ejection of the molded article.

In an aspect, the distance M between the downstream side-end surface 101 of the sprue-bush 100 and the most downstream portion 20a of the cooling medium-flow path 20 may be 0.1 mm to 5 mm, preferably 0.5 mm to 2 mm as shown FIG. 1.

In this aspect, the distance M between the downstream side-end surface 101 of the sprue-hush 100 and the most downstream portion 20a of the cooling medium-flow path 20 may be a relatively small value such as 0.1 mm to 5 mm. Due to the distance M of the relatively small value, the cooling heat due to the cooling medium flowing through the cooling medium-flow path 20 can be suitably transferred from the most downstream portion 20a thereof to the downstream side-end surface 101 of the sprue-bush 100. As a result, it is possible to suitably transfer the cooling heat due to the cooling medium to the melt raw resin in the downstream side-end portion 10b of the raw resin-flow path 10 where the cooling is most difficult, the downstream side-end portion 10b of the raw resin-flow path 10 being located in a region of the downstream side-end surface 101.

In an aspect, a formation region for the downstream side-end surface 101 of the sprue-bush 100 may include or may be composed of a material different from a material composing another region other than the formation region. The "formation region of the downstream side-end surface 101 of the sprue-bush 100" as used herein means a region which includes the downstream side-end surface 101 and a vicinity portion of the downstream side-end surface 101, the vicinity portion corresponding to a region between the downstream side-end surface 101 of the sprue-bush 100 and the most downstream portion 20a of the cooling medium-flow path 20/a region on the downstream side-end surface 101 as an example although not particularly limited thereto.

In the above, as an embodiment wherein the downstream side-end surface 101 of the sprue-bush 100 suitably serves as a heat transfer surface (i.e., a surface for transferring the cooling heat), an embodiment wherein the most downstream portion 20a of the cooling medium-flow path 20 is positioned to be "closer" to the downstream side-end surface 101 of the sprue-bush 100 has been described. However, the embodiment wherein the downstream side-end surface 101 of the sprue-bush 100 suitably serves as the head transfer surface (i.e., the surface for transferring the cooling heat) is net limited to the above embodiment. For example, the embodiment wherein the formation region for the downstream side-end surface 101 of the sprue-bush 100 includes the material different from the material composing another region other than the formation region may be adopted.

Specifically, a material which is contained in the formation region of the downstream side-end surface 101 of the sprue-bush 100 is a material having a relatively high heat conductivity, the material having the relatively high heat conductivity being at least one to be selected from a group of Ag, Cu, Al, Ni, or the like. Particularly, it is preferable that Al is contained in the formation region of the downstream side-end surface 101 of the sprue-bush 100. On the other hand, a material which is contained in another region other than the formation region of the downstream side-end surface 101 of the sprue-bush 100 is Fe as an example.

The formation region of the downstream side-end surface 101 of the sprue-bush 100 including the material having the relatively high heat conductivity can be formed by a "selective laser sintering method" as described later, the "selective laser sintering method" being a method for forming the shaped part of the sprue-bush 100 including the formation region. In other words, during a formation of the shaped part by the "selective laser sintering method", a material change is performed between a material for a portion corresponding to the "formation region of the downstream side-end surface 101 of the sprue-bush 100" and that of another portion other than the portion corresponding to the "formation region of the downstream side-end surface 101 of the sprue-bush 130". Without being limited to the above, the formation region may be provided by a welding of material having the relatively high heat conductivity which is at least one to be selected from a group of Ag, Cu, Al, Ni, or the like, preferably Al.

Due to a local use of the material having the relatively high heat conductivity, the formation region of the downstream side-end surface 101 of the sprue-bush 100 can suitably function as the "high heat conductivity region", the "high heat conductivity region" having the heat conductivity relatively higher than that of another region other than the formation region. The formation region which suitably functions as the "high heat conductivity region" allows the cooling heat to be effectively transferred from the position of the most downstream portion 20a to the downstream side-end surface 101 of the sprue-bush 10G. Due to the effective cooling heat transfer to the downstream side-end surface 101, it is possible to transfer the cooling heat to the melt raw resin in the downstream side-end portion 10b of the raw resin-flow path 10 where the cooling is most difficult, the downstream side-end portion 10b being located in the formation region of the downstream side-end surface 101, the cooling heat being due to the cooling medium. Thus, it is possible to effectively cool and subsequently solidify the melt raw resin in the downstream side-end portion 10b of the raw resin-flow path 10 where the cooling is most difficult. Furthermore, the formation region which suitably functions as the "high heat conductivity region" allows a cooling heat to be effectively transferred to the injection mold contacting the sprue-bush 100, the cooling heat being effectively transferred from the position of the most downstream portion 20a to the downstream side-end surface 101 of the sprue-bush 100. More specifically, the cooling heat can be effectively transferred to the runner portion R of the injection meld contacting the sprue-bush 10C. As a result, the melt raw resin in the injection mold located in a vicinity of a contact region with the sprue-bush 100 can be also effectively cooled and subsequently solidified.

Figure 2:
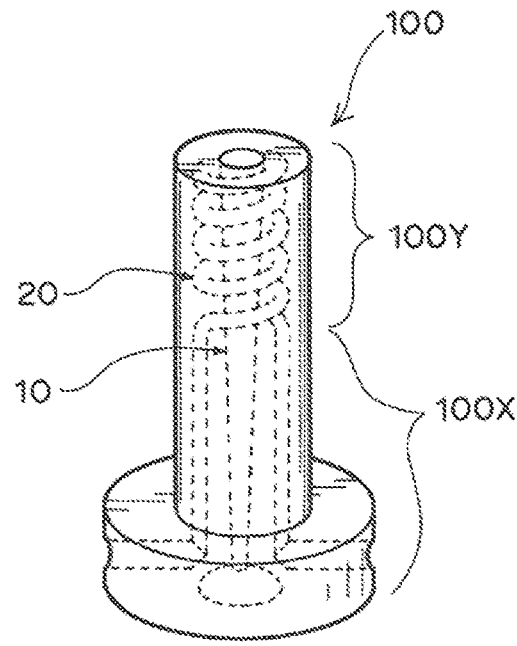
FIG. 2 is a perspective view schematically showing a sprue-bush according to an embodiment of the present invention.

In an aspect, the downstream side region 100Y of the sprue-bush 100 may be configured such that the cooling medium-flow path 20 surrounds the raw resin-flow path 10 as shown FIG. 2.

Specifically, the downstream side region 100Y of the sprue-bush 100 may be configured such that a downstream side of the cooling medium-flow path 20 surrounds a downstream side of the raw resin-flow path 10 as shown FIG. 2. Although not particularly limited, the downstream side region 100Y may be configured such that the downstream side of the cooling medium-flow path 20 has a helical configuration. In a case that the cooling medium-flow path 20, specifically the downstream side of the cooling medium-flow path 20 is configured to surround the raw resin-flow path 10, it is possible to transfer a cooling heat to the melt raw resin in the downstream side of raw resin-flow path 10 from any direction (i.e., substantially all directions) in a plan view, the cooling heat being due to the cooling medium flowing through the downstream side of the cooling medium-flow path 20, which makes it possible to suitably transfer the cooling heat to the melt raw resin whose cooling and subsequent solidification are relatively difficult in the downstream side of the raw resin-flow path 10, the cooling heat being due to the cooling medium flowing through the downstream side of the cooling medium-flow path 20. As a result, it is possible to suitably cool and subsequently solidify the melt raw resin in the downstream side of the raw resin-flow path 10 in the downstream side region 100Y of the sprue-bush 100. Therefore, upon a completion of a molding, a suitable ejection of a resin member from the raw resin-flow path 10 of the sprue-bush 100 is possible, the resin member being formed by the cooling and subsequent solidification.

Figure 3:
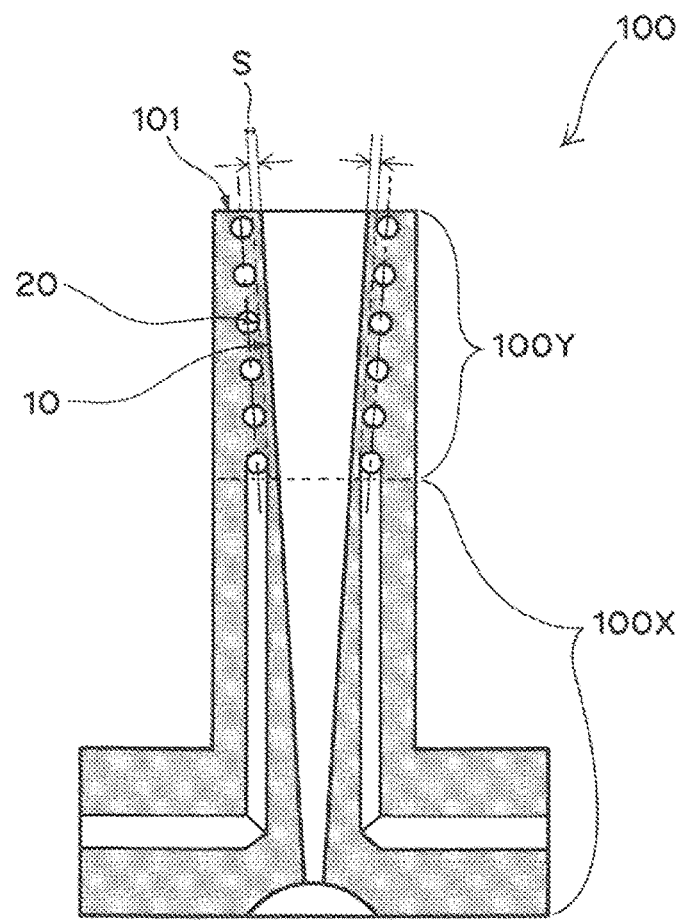
FIG. 3 is a cross-sectional view schematically showing a sprue-bush according to another embodiment of the present invention.

In an aspect, as shown in FIG. 3, any spaced distance S may be made substantial constant in a longitudinal direction of the raw resin-flow path 10 at the downstream side region 100Y of the sprue-bush 100, in a case that the cooling medium-flow path 20 is configured to surround the raw resin-flow path 10 at the downstream side region 100Y of the sprue-bush 100, the spaced distance S being defined between the raw resin-flow path 10 and the cooling medium-flow path 20.

In a case that the cooling medium-flow path 2C, specifically the downstream side of the cooling medium-flow path 20 is configured to surround the raw resin-flow path 10 at the downstream side region 100Y of the sprue-bush 100, it is possible to transfer a cooling heat to the melt raw resin in the downstream side of the raw resin-flow path 10 from any direction in a plan view, the cooling heat being due to the cooling medium flowing through the downstream side of the cooling medium-flow path 20. Then, in a case that any spaced distance S between the raw resin-flow path 10 and the cooling medium-flow path 20 surrounding the raw resin-flow path 10 is made substantial constant in the longitudinal direction of the raw resin-flow path 10 in the downstream side region 100Y of the sprue-bush 100, a distance between the downstream side of the cooling medium-flow path 20 surrounding the raw resin-flow path 10 and the downstream side of the raw resin-flow path 10 is made substantial equal at any point in a top plan view. Thus, the cooling heat due to the cooling medium flowing through the downstream side of the cooling medium-flow path 20 can be uniformly transferred to any point of the downstream side of the raw resin-flow path 10. Therefore, the melt raw resin in the downstream side of the raw resin-flow path 10 can be uniformly melt and subsequently solidified.

In an aspect, as shown in FIG. A, a pitch of the cooling medium-flow path 20 in a cross-sectional view may gradually become smaller toward the downstream side-end surface 101 of the sprue-bush 100 at the downstream side region 100Y of the sprue-bush 100, in a case that the cooling medium-flow path 20 is configured to surround the raw resin-flow path 10 at the downstream side region 100Y of the sprue-bush 100.

Figure 4:
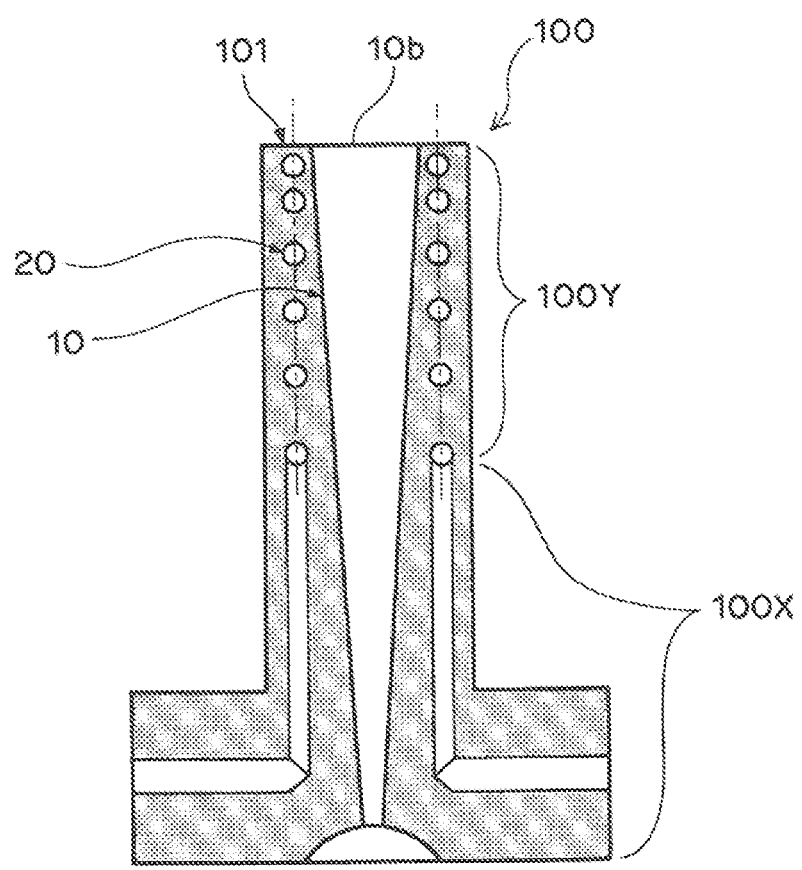
FIG. 4 is a cross-sectional view schematically showing a sprue-bush according to further another embodiment of the present invention.

The width-dimension of the raw resin-flow path 10 is configured to gradually increase toward the downstream side-end surface 101 of the sprue-bush 100 as shown in FIG. 4. The gradual increase of the width-dimension makes a surface area of the cooling medium-flew path 20 larger. Thus, the larger surface area of the cooling medium-flow path 20 makes it difficult to suitably transfer the cooling heat due to the cooling medium flowing through the cooling medium-flow path 20 to the melt raw resin. In particular, this difficulty may be apparent toward the downstream side-end surface 101 of the sprue-bush 100, i.e., toward the downstream side-end portion 10b of the raw resin-flow path 10. In light of the above, the cooling medium-flow path 20 may be configured such that the pitch thereof in the cross-sectional view may gradually become smaller toward the downstream side-end surface 101 of the sprue-bush 100 at the downstream side region 100Y of the sprue-bush 100. Due to an incorporation of such the configuration, the cooling heat due to the cooling medium can be intensively transferred to the downstream side-end portion 10b of the raw resin-flow path 10 and the vicinity of the downstream side-end portion 10b of the raw resin-flow path 10 as shown in FIG. 4. As a result, it is possible to more suitably transfer the cooling heat to the melt raw resin in the downstream side-end portion 10b of the raw resin-flow path 10 and that in the vicinity of the downstream side-end portion 10b, the cooling heat being due to the cooling medium.

Figure 5:
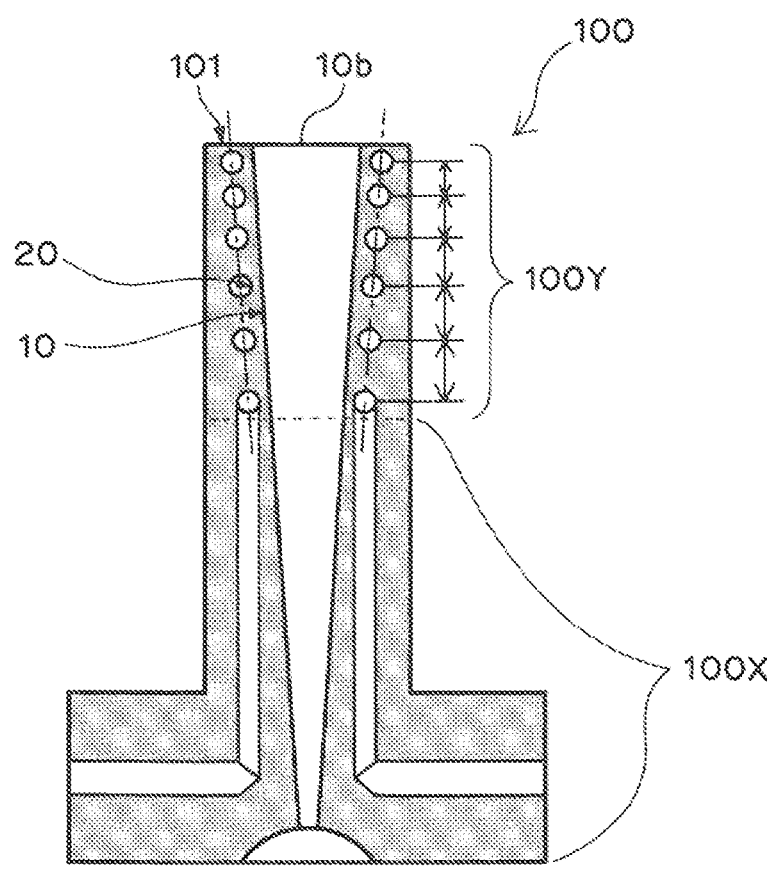

In an aspect, any spaced distance S may be made substantial constant in a longitudinal direction of the raw resin-flow path 10 at the downstream side region 100Y of the sprue-bush 100, the spaced distance S being defined between the raw resin-flow path 10 and the cooling medium-flow path 20, and also a pitch of the cooling medium-flow path 20 in a cross-sectional view may gradually become smaller toward the downstream side-end surface 101 of the sprue-bush 100 at the downstream side region 100Y of the sprue-bush 100, in a case chat the cooling medium-flow path 20 is configured to surround the raw resin-flow path 10 at the downstream side region 100Y of the sprue-bush 100 (see FIG. 5).

In a case that the cooling medium-flow path 20, specifically the downstream side of the cooling medium-flow path 20 is configured to surround the raw resin-flow path 10 at the downstream side region 100Y of the sprue-bush 100, it is possible to transfer a cooling heat to the melt raw resin in the downstream side of the raw resin-flow path 10 from any direction in a plan view, the cooling heat being due to the cooling medium flowing through the downstream side of the cooling medium-flow path 20. Then, in a case that any spaced distance S between the raw resin-flow path 10 and the cooling medium-flow path 20 surrounding the raw resin-flow path 10 is made substantial constant in the longitudinal direction of the raw resin-flow path 10 in the downstream side region 100Y of the sprue-bush 100, a distance between the downstream side of the cooling medium-flow path 20 surrounding the raw resin-flow path 10 and the downstream side of the raw resin-flow path 10 is made substantial equal at any point in a top plan view. Thus, the cooling heat due to the cooling medium flowing through the downstream side of the cooling medium-flew path 20 can be uniformly transferred to any point of the downstream side of the raw resin-flow path 10. Therefore, the melt raw resin in the downstream side of the raw resin-flow path 10 can be uniformly melt and subsequently solidified. The width-dimension of the raw resin-flow path 10 is configured to gradually increase toward the downstream side-end surface 101 of the sprue-bush 100 as shown in FIG. 4. The gradual increase of the width-dimension makes a surface area of the cooling medium-flow path 20 larger. Thus, the larger surface area of the cooling medium-flow path 20 makes it difficult to suitably transfer the cooling heat due to the cooling medium flowing through the coding medium-flow path 20 to the melt raw resin. In particular, this difficulty may be apparent toward the downstream side-end surface 101 of the sprue-bush 100, i.e., toward the downstream side-end portion 10b of the raw resin-flow path 10. In light of the above, the cooling medium-flow path 20 may be configured such that the pitch thereof in the cross-sectional view may gradually become smaller toward the downstream side-end surface 101 of the sprue-bush 100 at the downstream side region 100Y of the sprue-bush 100. Due to an incorporation of such the configuration, the cooling heat due to the cooling medium can be intensively transferred to the downstream side-end portion 10b of the raw resin-flow path 10 and the vicinity of the downstream side-end portion 10b of the raw resin-flow path 10 as shown in FIG. 4. As a result, it is possible to more suitably transfer the cooling heat to the melt raw resin in the downstream side-end portion 10b of the raw resin-flow path 10 and that in the vicinity of the downstream side-end portion 10b, the cooling heat being due to the cooling medium.

As described above, the upstream side region 100X of the sprue-bush 100 may be configured such that the cooling medium-flow path 20 having the configuration of the straight pipe is located around the upstream side of the raw resin-flow path 10 as shown in FIG. 1. The downstream side region 100Y of the sprue-bush 100 may be configured such that the cooling medium-flow path 20 is located around the downstream side of the raw resin-flow path 10 as shown in FIG. 1. Hereinafter, a method for manufacturing a sprue-bush of the present invention will be described, the sprue-bush having the above configurations.

<1. Preparation of Base Part>

Figure 6:
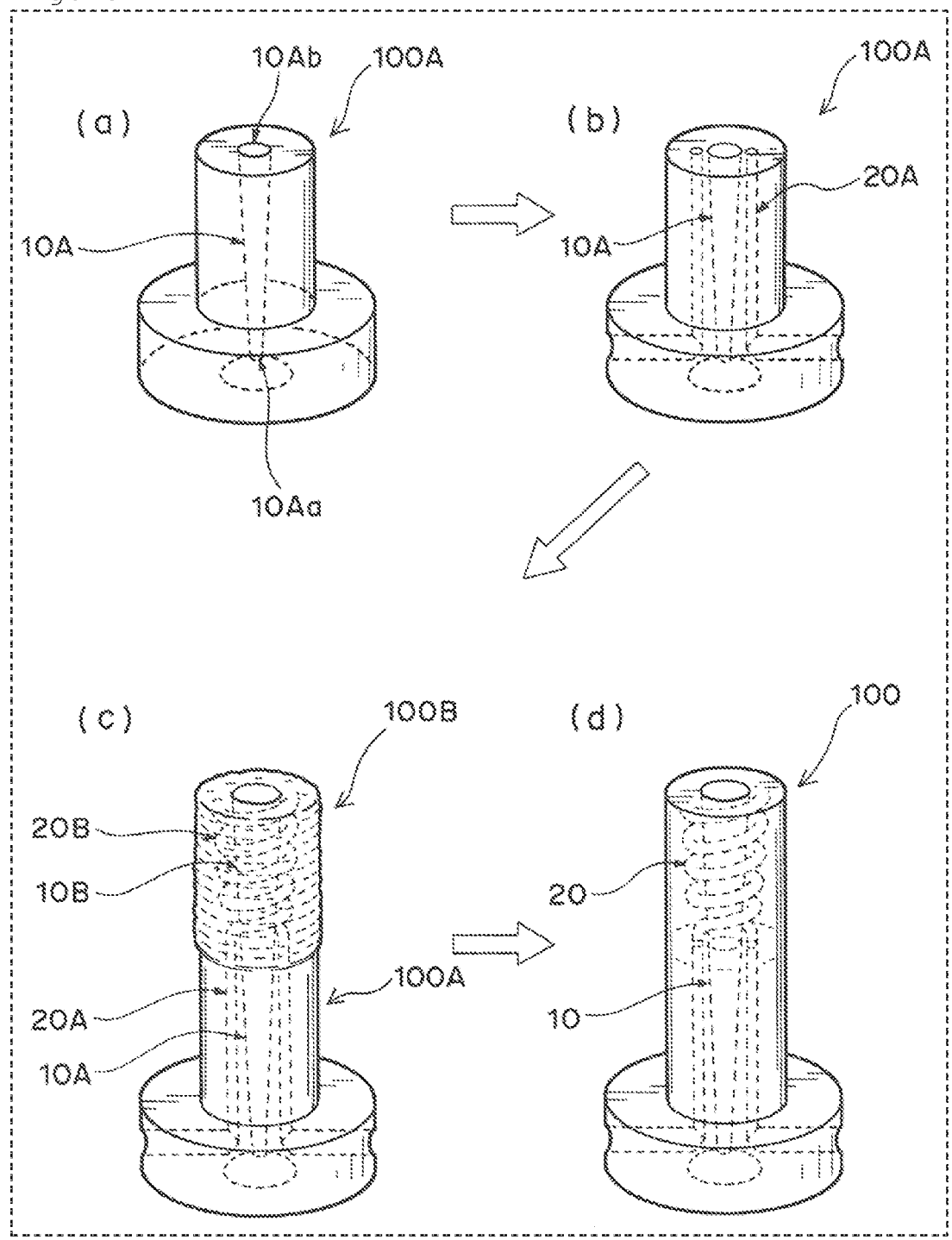
FIG. 6 is a cross-sectional view schematically showing a sprue-bush according to further another embodiment of the present invention.

As shown in (a) of FIG. 6, a base part 100A including a raw resin-flow path 10A therein is prepared, the raw resin-flow path 10A extending to pass from the one of ends 10Aa to the other of ends 10Ab. The "base part 100A" as used herein substantially means an existing sprue-bush and the upstream side 100X of the sprue-bush 100 of present invention as described above. The upstream raw resin-flow path portion 10A may be configured such that Its width dimension gradually Increases from the upstream side toward the downstream side.

As shown in (b) of FIG. 6, the base part 100A is subjected to a machine process such that a cooling medium-flow path 20A is provided in the base part 100A. Specifically, the base part 100A subjected to the machine process to form the cooling medium-flow path 20A in the base part 100A, the cooling medium-flow path 20A having a configuration of a straight pipe and being located around the raw resin-flow path 10A. The "cooling medium-flow path 20A having the configuration of the straight pipe" as used herein corresponds to the upstream side of the cooling medium-flow path 20 of the sprue-bush 100 in the present invention. Although not particularly limited, in terms of an uniform transfer of the cooling medium heat flowing through the cooling medium-flow path 20A to the melt raw resin in the raw resin-flow path 10A, the cooling medium-flow path 20A may be positioned to extend in substantial parallel to an extending direction of the upstream raw resin-flow path portion 10A, in the base part 100A. Furthermore, although not limited, an opening for an inflow and/or an outflow of the cooling medium may be provided on a side portion of an upstream side of the base part 100A. In detail, the cooling medium-flow path 20A may have a continuous configuration from the opening to the straight pipe portion located around the raw resin-flow path 10A. An end mill may be used as a machine tool for the machine process for example. Although not particularly limited, a double-blade ball end mill of a super hard material or the like may be used as the end mill for example. In this manner, the base part 100A including the raw resin-flow path 10A and the cooling medium-flew path 20A therein is prepared.

<2. Formation of Shaped Part>

A shaped part 100B to be located on the base part 100A is formed as shown in (c) of FIG. 6. The shaped part 100B can be formed by a "selective laser sintering me-hod" for example. The "shaped part 100B" corresponds to a downstream side 100Y of the sprue-bush 100 of the present invention.

The "selective laser sintering method" to be used for manufacturing the shaped part 100B is a method which is capable of manufacturing a three-dimensional shaped object by irradiating a powder material with a light beam. The method can produce the three-dimensional shaped object by an alternate repetition of a powder-layer forming and a solidified-layer forming on the basis of the following (i) and (ii):

(i) forming a solidified layer by irradiating a predetermined portion of a powder layer with a light bean, thereby allowing a sintering of the powder at the predetermined portion or a melting and subsequent solidification of the powder at the predetermined portion; and (ii) forming another solidified layer by newly forming a powder layer on the formed solidified layer, followed by similarly irradiating the powder layer with the light beam.

This kind of technology makes it possible to produce the three-dimensional shaped object with its complicated contour shape in a short period of time. The three-dimensional shaped object obtained can be used as a shaped part 100B in a case where a metal powder material is used as the powder material.

Figure 7A:
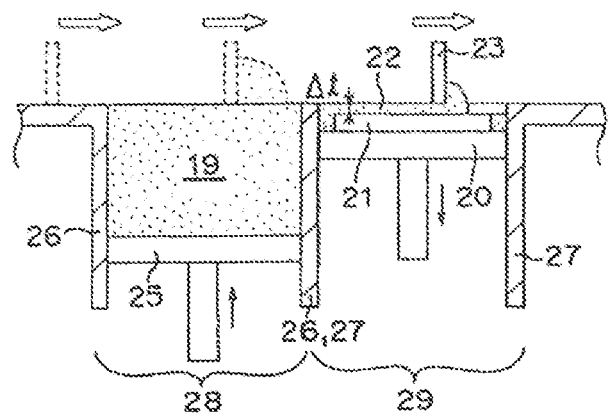
FIG. 7A is a cross-sectional view schematically illustrating a laser-sintering/machining hybrid process upon a formation of a powder layer in accordance with a selective laser sintering method.
Figure 7B:
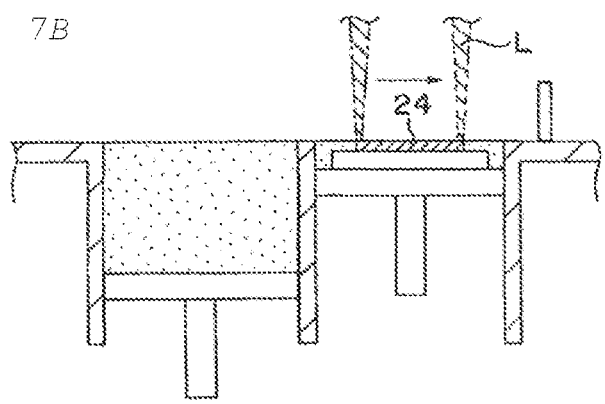
FIG. 7B is a cross-sectional view schematically illustrating a laser-sintering/machining hybrid process upon a formation of a solidified layer in accordance with a selective laser sintering method.
Figure 7C:
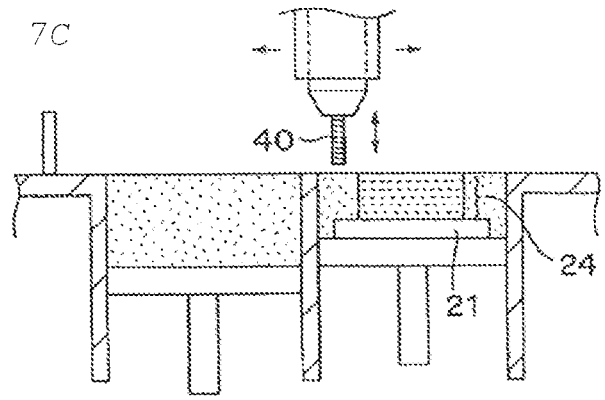
FIG. 7C is a cross-sectional view schematically illustrating a laser-sintering/machining hybrid process in a process of a stacking in accordance with a selective laser sintering method.
Figure 8:
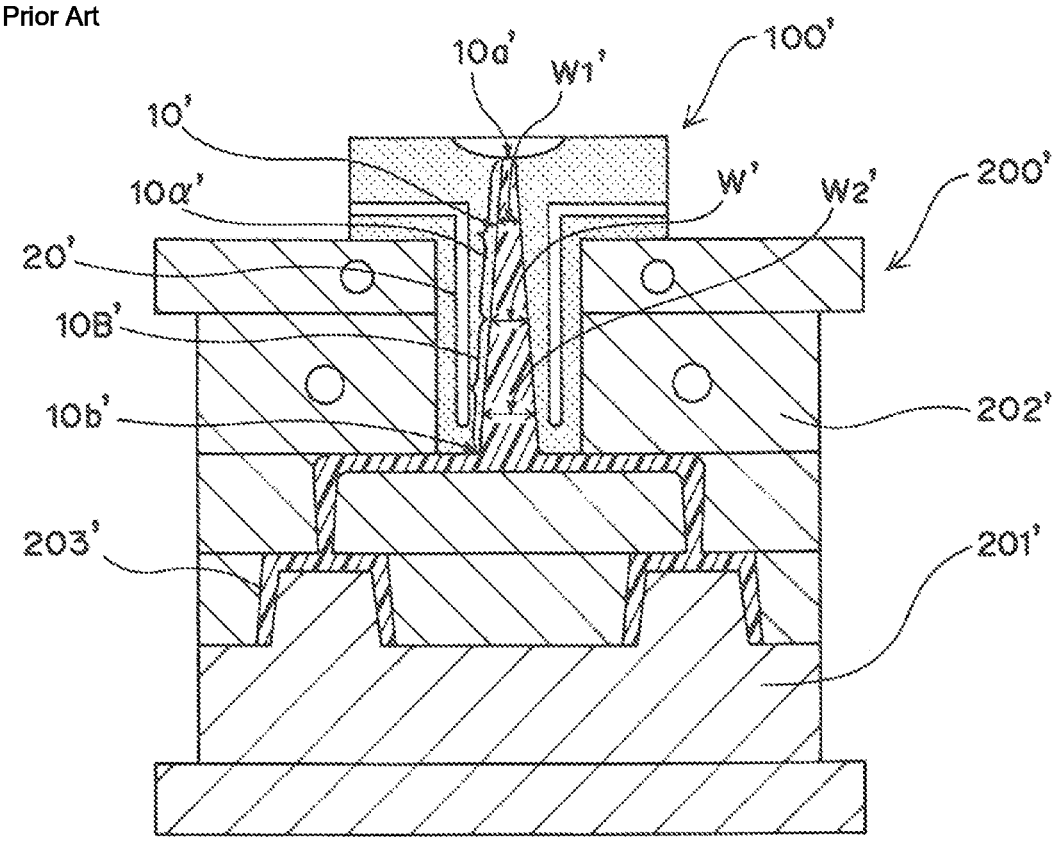
FIG. 8 is a cross-sectional view schematically showing a conventional sprue-bush.

In a case of an example wherein the metal powder is used as the material to manufacture the three-dimensional shaped object by the selective laser sintering method, as shown in FIGS. 7A-7C, a powder layer 22 with its predetermined thickness is firstly formed on a base plate 21 by a movement of a squeegee blade 23 (see FIG. 7A). Then, a predetermined portion of the powder layer 22 is irradiated with a light beam L to form a solidified layer 24 (see FIG. 7B). Another powder layer is newly provided on the formed solidified layer, and is irradiated again with the light beam to form another solidified layer. In this way, the powder-layer forming and the solidified-layer forming are alternately repeated, and thereby allowing the solidified layers 24 to be stacked with each other (see FIG. 7C). The alternate repetition of the powder-layer forming and the solidified-layer forming leads to a production of a three-dimensional shaped object with a plurality of the solidified layers stacked therein.

As shown in (c) of FIG. 6, upon a formation of the shaped part 100B, the shaped part 100B is formed by the selective laser sintering method such that the shaped part 100B has a raw resin-flow path 10B and a cooling medium-flow path around the raw resin-flow path 10B respectively in the shaped part 100B. The raw resin-flow path 10 in the sprue-bush 100 to be finally obtained may be configured such that its width dimension gradually increases from the upstream side toward the downstream side. In this case, since the raw resin-flow path 10 in the sprue-bush 100 to be finally obtained may be configured such that its width dimension gradually increases from the upstream side toward the downstream side, a cooling and subsequent solidification of the melt raw resin in the downstream side may be difficult. Thus, it is necessary to suitably cool and subsequently solidify the melt raw resin in the downstream side of the raw resin-flow path 10 of the sprue-bush 100 to be finally obtained, that is, in the downstream raw resin-flow path portion 10B.

The "raw resin-flow path 10B" corresponds to a downstream side of the raw resin-flow path 10 of the sprue-bush 100 of the present invention. The "cooling medium-flow path 20B" corresponds to a downstream side of the cooling medium-flow path 20 of the sprue-bush 100 of the present invention. In a case that the cooling medium-flow path 20B is located to surround the raw resin-flow path 10B in the shaped part 100B, it is possible to transfer a cooling heat to the melt raw resin in the raw resin-flow path 10B from any direction in a plan view, the cooling heat being due to the cooling medium flowing through the cooling medium-flow path 20B, which makes it possible to suitably transfer the cooling heat to the melt raw resin whose cooling and subsequent solidification are relatively difficult in the raw resin-flow path 10B, the coding heal being due to the cooling medium flowing through the cooling medium-flow path 20B. Thus, the cooling heat due to the cooling medium flowing through the cooling medium-flow path 20B can be suitably transferred to the melt raw resin whose cooling and subsequent solidification are relatively difficult in the raw resin-flow path 10B.

The following aspect can be adopted to form the raw resin-flow path 10B and the downstream cooling medium-flow path 20B to be provided to surround the raw resin-flow path 10B. Firstly, upon a formation of a solidified layer, a non-irradiated portion which is not partially irradiated with the light bean is formed. Specifically, upon the formation of the solidified layer by the selective laser sintering method, a predetermined region to be the raw resin-flow path 10B and the cooling medium-flow path 20B is not irradiated with the light beam to form the non-irradiated portion, the cooling medium-flow path 20B being located to surround the raw resin-flow path 10B. After a formation of the non-irradiated portion, powders which may exist in the non-irradiated portion are finally removed. Thus, it is possible to form the raw resin-flow path 10B and the cooling medium-flow path 20B located to surround the raw resin-flow path 10B in the shaped part 100B.

<3. Location of Shaped Part on Base Part>

After a formation of the shaped part 100B, the shaped part 100B is located on the base part 100A. Specifically, the shaped part 100B is located on the base part 100A such that the raw resin-flow path 10A of the base part 100A and the raw resin-flow path 10B of the shaped part 103B are connected with each other and the cooling medium-flow path 20A of the base part 100A and the cooling medium-flow path 20B to be provided to surround the raw resin-flow path 10B are connected with each other. Thus, the sprue-bush 100 of the present invention can be obtained.

As a location embodiment of the shaped part 120B on the base part 100A, there are the following two embodiments.

One of examples is that a formation of the shaped part 100B is performed on the shaped part 100A for the location of the shaped part 100B on the base part 100A. In a case that the formation of the shaped part 103B is performed on the base part 100A, the solidified layer (i.e., a composition element of the shaped part 100B) is formed by irradiating a predetermined portion of the powder layer located on the base part 100A with the light beam L. In this case, due to the melt and subsequent solidification of the metal powder on the base part 100A by the irradiation of the predetermined portion with the light beam L, it is possible to improve a connection-strength between the solidified layer obtained from the melt and subsequently solidified metal powder and the base part 100A.

One of examples is that a formation of the shaped part 100B is perforated at a location other than the base part 100A and the shaped object 100B formed may be disposed on the base part 100A. Specifically, a formation of the shaped part 100B is performed in advance at a location other than the base part 100A in accordance with the selective laser sintering method, the shaped part 1003 being configured such that the cooling medium-flow path 203 surrounds the raw resin-flow 10B. After the formation of the shaped part 100 in accordance with the selective laser sintering method, the formed shaped part 100B is located on the base part 100A. Specifically, the shaped part 100B is located on the base part 100A such that the raw resin-flow path 10A of the base part 100A and the raw resin-flow path 10B of the shaped part 100B are connected with each other and the cooling medium-flow path 20A of the base part 100A and the cooling medium-flow path 20B of the shape part 100B are connected with each other. It is preferable that a fixing of the formed shaped part 100B on the base part 100A is performed by a brazing or the like. Thus, the sprue-bush 100 of the present invention can be obtained. As to the base part 100A, it is necessary to form the cooling medium-flow path 20A having the configuration of the straight pipe around the raw resin-flow path 10A by the machine process. In this regard, according to the embodiment wherein the formation of the shaped part 100B is performed at the location other than the base part 100A, the shaped part 100B is formed independently. Thus, it is possible to perform simultaneous parallel formations of a formation of the upstream cooling medium-flow path portion 20A having the configuration of the straight pipe and a formation of the shaped part 100D. Due to the simultaneous parallel formations, a manufacturing Lime for the sprue-bush 100 of the present invention can be shortened as a whole.

<4. Performance of Machine Process>

Finally, as shown in (d) of FIG. 6, it is preferable that a surface of the sprue-bush 100 of the present invention, particularly a surface of a location region of the shaped part 100B is subjected to a machine process, the sprue-bush 100 being obtained by the location of the shaped part 1003 on the base part 100A.

The shaped part 100B to be obtained by the selective laser sintering method has a relatively rough surface. For example, the shaped part 100B has a surface with its surface roughness of about several hundred µm Rz. The surface roughness is caused by an adherence of the powder to a surface of the solidified layer for forming the shaped part 100B. Upon a formation of the solidified layer, due to a conversion of an energy of the light beam to a heat, the powder at a predetermined portion of the powder layer irradiated with the light beam is sintered or melted and subsequently solidified. At this time, a temperature of powders around the predetermined portion may also increase, and thus the surrounding powder adheres to the surface of the solidified layer. In this way, the adherence of the powder nay cause the shaped part 100B, i.e., the three-dimensional shaped object, which has the surface roughness. In light of the above matters, it is preferable that the surface of the sprue-bush 100 of the present invention, particularly the surface of the location region of the shaped part 100B is subjected to the machine process, the sprue-bush 100 being obtained by the location of the shaped part 100B on the base part 100A.

In an aspect, the base part may be subjected to a machine process before the shaped part is located on the base part.

As described above, the sprue-bush of the present invention can be obtained by the location of the shaped part on the base part. The base part substantially means the existing sprue-bush and thus the base part can be used as an injection molding part even if another part (i.e., the shaped part) is not intentionally located on the base part itself. As a result, the location of the shaped port on the base part without a particular processing of the base part may make a dimension of the sprue-bush of the present invention to be finally obtained larger as a whole compared with a desired dimension thereof. In light of the above matters, it is preferable to subject the existing sprue-bush to be used as the base part to the machine process to perform a dimension adjustment for making a distension of the existing sprue-bush smaller compared with a dimension thereof before the machine process. Specifically, the base part, that is, the existing sprue-bush generally includes a flange portion and an extension portion on the flange portion. Thus, the base part may be subjected to the machine process to make a longitudinal dimension of the extension portion of the base part smaller, which may lead to a dimension reduction of the base part. As to a degree of the dimension reduction of the base part, it is preferable to determine the degree in view of a dimension of the sprue-bush of the present invention to be finally obtained. As a result, the location of the shaped part on the base part having the adjusted dimension make it possible to finally obtain the sprue-bush having a desirable dimension in the present invention.

Although the sprue-bush according to an embodiment of the present invention has been hereinbefore described, the present invention is not limited to the above embodiment. It will be readily appreciated by the skilled person that various modifications are possible without departing from the scope of the present invention.

It should be noted that an embodiment of the present invention as described above includes the following preferable aspects:

The first aspect: A sprue-bush, comprising a raw resin-flow path and a coding medium-flow path located around the raw resin-flow path, wherein a width dimension of the raw resin-flow path gradually becomes larger toward a downstream side-end surface of the sprue-bush, and wherein the downstream side-end surface of the sprue-bush is a heat transfer surface.

The second aspect: The sprue-bush according to the first aspect, wherein a spaced distance between the downstream side-end surface of the sprue-bush and a most downstream portion of the cooling medium-flow path is smaller than that between the raw resin-flow path and the cooling medium-flow path.

The third aspect: The sprue-bush according no the first or second aspect, wherein the spaced distance between the downstream side-end surface of the sprue-bush and the most downstream portion of the cooling medium-flow path is 0.1 mm to 5 mm.

The fourth aspect: The sprue-bush according to any one of the first to third aspects, wherein a formation region for the downstream side-end surface of the sprue-bush comprises a material different from a material composing another region other than the formation region.

The fifth aspect: The sprue-bush according to any one of the first to fourth aspects, wherein the cooling medium-flow path is configured to surround the raw resin-flow path at a downstream side region of the sprue-bush.

The sixth aspect: The sprue-bush according to the fifth aspect, wherein any spaced distance is made substantial constant in a longitudinal direction of the raw resin-flow path at the downstream side region of the sprue-bush, the spaced distance being defined between the raw resin-flow path and the cooling medium-flow path.

The seventh aspect: The sprue-bush according to the fifth or sixth aspect, wherein a pitch of the cooling medium-flow path in a cross-sectional view of the sprue-bush gradually becomes smaller toward the downstream side-end surface of the sprue-bush at the downstream side region of the sprue-bush.

INDUSTRIAL APPLICABILITY

The sprue-bush according to an embodiment of the present invention can be used to incorporate a melt raw resin injected from an injection mechanism into a mold cavity composed of one of mold parts (i.e., a core side) and other of mold parts (i.e., a cavity side) in an injection mold.

CROSS REFERENCE TO RELATED PATENT APPLICATION

The present application claims the right of priority of Japanese Patent Application No. 2016-129261 (filed or; Jun. 29, 2016, the title of the invention: "SPRUE-BUSH"), the disclosure of which is incorporated herein by reference.

EXPLANATION OF REFERENCE NUMERALS

100 Sprue-bush
100Y Downstream side region of sprue-bush
101 Downstream side-end surface of sprue-bush
10 Raw resin-flow path
20 Cooling medium-flow path
20a Most downstream portion of cooling medium-flow path
K Distance between downstream side-end surface of sprue-bush and most downstream portion of cooling medium-flow path
S Spaced distance between raw resin-flow path and cooling medium-flow path
R Runner portion

The invention claimed is:

1. A sprue-bush, comprising;
a raw resin-flow path; and
a cooling medium-flow path located around the raw resin-flow path,
wherein a width dimension of the raw resin-flow path increases toward a downstream side-end surface of the sprue-bush,
wherein the downstream side-end surface of the sprue-bush is a heat transfer surface,
wherein a distance between the downstream side-end surface of the sprue-bush and a most downstream portion of the cooling medium-flow path is smaller than a distance between the raw resin-flow path and the cooling medium-flow path,
wherein the cooling medium-flow path is configured to surround the raw resin-flow path at a downstream side region of the sprue-bush, and
wherein a pitch of the cooling medium-flow path in a cross-sectional view of the sprue-bush decreases toward the downstream side-end surface of the sprue-bush, the pitch being a distance between adjacent locations of the cooling medium-flow path, in the cross-sectional view.

2. The sprue-bush according to claim 1,
wherein the distance between the downstream side-end surface of the sprue-bush and the most downstream portion of the cooling medium-flow path is 0.1 mm to 5 mm.

3. The sprue-bush according to claim 1,
wherein a formation region for the downstream side-end surface of the sprue-bush comprises a material different from a material of a region other than the formation region.

4. The sprue-bush according to claim 3,
wherein a conductivity of the material of the formation region is higher than a conductivity of the material of the region other than the formation region.

5. The sprue-bush according to claim 1,
wherein a distance is constant in a longitudinal direction of the raw resin-flow path at the downstream side region of the sprue-bush, the distance being defined between the raw resin-flow path and the cooling medium-flow path.

6. A sprue-bush, comprising:
a raw resin-flow path; and
a cooling medium-flow path that extends around the raw resin-flow path,
wherein a width of the raw resin-flow path increases towards a downstream side-end surface of the sprue-brush,
wherein the downstream side-end surface of the sprue-brush comprises a heat transfer surface, and
wherein, the cooling medium-flow path extends helically around the raw resin-flow path with a pitch, in a cross-sectional view of the sprue-brush, that decreases towards the downstream side-end surface of the sprue-brush, the pitch being a distance between adjacent locations of the cooling medium-flow path, in the cross-sectional view.

7. The sprue-bush according to claim 6,
wherein a distance between the downstream side-end surface of the sprue-brush and a most downstream portion of the cooling medium-flow path is smaller than a distance between the raw resin-flow path and the cooling medium-flow path.

8. The sprue-bush according to claim 7,
wherein the distance between the downstream side-end surface of the sprue-brush and the most downstream portion of the cooling medium-flow path is 0.1 mm to 5 mm.

9. The sprue-bush according to claim 6,
wherein a formation region of the downstream side-end surface of the sprue-brush comprises a material different from a material of a region other than the formation region.

10. The sprue-bush according to claim 9,
wherein a conductivity of the material of the formation region is higher than a conductivity of the material of the region other than the formation region.

11. The sprue-bush according to claim 6,
wherein a distance between the raw resin-flow path and the cooling medium-flow path is constant in a longitudinal direction of the raw resin-flow path at the downstream side region of the sprue-brush.

\* \* \* \* \*